United States Patent
Schuessler et al.

(10) Patent No.: US 9,890,886 B2
(45) Date of Patent: Feb. 13, 2018

(54) REVERSE SNAP PUSH/PULL QUICK CONNECT COUPLING

(71) Applicant: Miniature Precision Components, Inc., Walworth, WI (US)

(72) Inventors: Brian Schuessler, Lake Geneva, WI (US); Brandon Meister-Place, Walworth, WI (US)

(73) Assignee: MINIATURE PRECISION COMPONENTS, INC., Walworth, WI (US)

( * ) Notice: Subject to any disclaimer, the term of this patent is extended or adjusted under 35 U.S.C. 154(b) by 475 days.

(21) Appl. No.: 14/622,257

(22) Filed: Feb. 13, 2015

(65) Prior Publication Data

US 2015/0219262 A1  Aug. 6, 2015
US 2017/0067587 A9  Mar. 9, 2017

Related U.S. Application Data

(60) Provisional application No. 61/939,796, filed on Feb. 14, 2014.

(51) Int. Cl.

| | |
|---|---|
| *F16L 37/00* | (2006.01) |
| *F16L 37/086* | (2006.01) |
| *F16L 41/08* | (2006.01) |
| *F16L 21/035* | (2006.01) |
| *F16L 33/00* | (2006.01) |
| *F16L 33/30* | (2006.01) |

(52) U.S. Cl.
CPC .......... *F16L 37/086* (2013.01); *F16L 21/035* (2013.01); *F16L 33/003* (2013.01); *F16L 33/30* (2013.01); *F16L 41/08* (2013.01)

(58) Field of Classification Search
CPC ....... F16L 21/035; F16L 33/003; F16L 33/30; F16L 37/086; F16L 41/08
USPC .................................................. 285/308, 319
See application file for complete search history.

(56) References Cited

U.S. PATENT DOCUMENTS

| | | | |
|---|---|---|---|
| 3,885,851 | A | 5/1975 | Bennett |
| 3,964,771 | A | 6/1976 | Baudouin |
| 4,533,194 | A | 8/1985 | Boichut et al. |

(Continued)

FOREIGN PATENT DOCUMENTS

EP         1243839 A2      9/2002

*Primary Examiner* — Gregory J Binda
(74) *Attorney, Agent, or Firm* — Dickinson Wright PLLC

(57) ABSTRACT

A quick connect coupling assembly for interconnecting a tubular component to a mounting component is provided. The coupling assembly includes a retainer adapted to be coupled to the mounting component and having a pair of resiliently cantilevered snap arms. A housing for coupling with the mounting component has an inner cam surface and is configured to abut the mounting component. The snap arms each include a first deflector ramp that is aligned in proximity to the inner cam surface and a second deflector ramp adapted to releaseably engage a back surface of the mounting component. A push/pull feature permits the retainer to be pushed and causes the first deflector ramps to engage the inner cam surface and cause the snap arms to deflect inwardly and release the second deflector ramp from engagement with the back surface and allow the coupling assembly to be pulled out of the mounting component.

20 Claims, 9 Drawing Sheets

(56) References Cited

U.S. PATENT DOCUMENTS

| | | | |
|---|---|---|---|
| 4,979,765 A * | 12/1990 | Bartholomew | F16L 37/0982 |
| | | | 285/308 |
| 5,779,279 A * | 7/1998 | Bartholomew | F16L 37/0987 |
| | | | 285/319 |
| 6,073,974 A | 6/2000 | Meisinger et al. | |
| 6,145,894 A | 11/2000 | Myers | |
| 6,435,756 B1 | 8/2002 | Robin et al. | |
| 7,270,349 B2 | 9/2007 | Bamberger et al. | |
| 7,806,714 B2 | 10/2010 | Williams et al. | |
| 7,922,215 B2 | 4/2011 | Salomon-Bahls et al. | |
| 8,128,130 B2 | 3/2012 | Robin et al. | |
| 2015/0219262 A1 * | 8/2015 | Schuessler | F16L 41/08 |
| | | | 285/317 |

* cited by examiner

REVERSE SNAP PUSH/PULL QUICK CONNECT COUPLING

CROSS-REFERENCE TO RELATED APPLICATIONS

This utility application claims the benefit of U.S. Provisional Application No. 61/936,796, filed Feb. 14, 2014, the entire disclosure of which is incorporated herein by reference.

FIELD

The present disclosure relates generally to quick connect coupling assemblies of the type used in motor vehicle fluid systems to releaseably connect a tube or conduit to a port structure and, more particularly, to a quick connect coupling assembly having a push/pull disconnect feature.

BACKGROUND

Quick connect coupling assemblies are well known in the art for releasably coupling a first component (i.e. hose, tube, conduit, etc.) to a second component to provide fluid communication therebetween. Quick connect coupling assemblies find wide utilization in the automotive applications for releaseably coupling a pair of fluid lines (i.e. fuel lines, brake lines, oil lines, water lines, air lines, hydraulic lines, etc.) or for releaseably coupling one fluid line to a port associated with a housing.

Conventional quick connect coupling assemblies typically include some type of disconnect feature that permits intentional and deliberate release of the interconnection between the components. To this end, a need exists to continue to define and develop disconnect mechanisms for use with quick connect coupling assemblies.

SUMMARY

This section provides a general summary of the inventive concepts associated with the present disclosure and is not intended to represent a comprehensive disclosure of its full scope or all of its features, object, aspects, and advantages.

According to one aspect of the present disclosure, a quick connect coupling assembly is provided for releaseably connecting a first component to a second component for establishing a fluid communication therebetween.

According to another aspect of the present disclosure, the quick connect coupling assembly comprises a retainer adapted to be coupled to the tubular component and has at least one resilient snap arm resiliently cantilevered from the retainer. A housing for coupling with the mounting component has an inner cam surface and is configured to abut the port segment of the mounting component. The snap arm includes a first deflector ramp and is aligned in proximity to the inner cam surface. The snap arm also includes a second deflector ramp that is adapted to releaseably engage a back surface of the mounting component and retain the coupling assembly as the housing engages the mounting component. A push/pull feature permits the retainer to be pushed relative to the housing and causes the first deflector ramp to engage the inner cam surface and cause the snap arm to deflect inwardly and release the second deflector ramp from engagement with the back surface and allow the coupling assembly to be subsequently pulled out of the port segment.

According to another aspect of the present disclosure, the quick connect coupling assembly comprises a retainer adapted to be coupled to the tubular component and has at least one resilient snap arm extending outwardly and resiliently cantilevered from the retainer. A housing for coupling with the mounting component has an inner cam surface and is configured to abut the port segment of the mounting component. The snap arm includes a first prong segment generally arranged to extend collinearly with the retainer and has a first deflector ramp extending outwardly and aligned in proximity to the inner cam surface. The snap arm includes a second prong segment extending radially outwardly and aligned in proximity to the housing. The second prong segment has a second deflector ramp extending radially outwardly and adapted to releaseably engage a back surface of the mounting component and retain the coupling assembly as the housing engages the mounting component. A push/pull feature permits the retainer to be pushed relative to the housing and causes the first deflector ramp to engage the inner cam surface and cause the snap arm to deflect inwardly and release the second deflector ramp from engagement with the back surface and allow the coupling assembly to be subsequently pulled out of the port segment.

These and other aspects are associated with the quick connect coupling assembly illustrated in the following drawings and which provides a push/pull disconnect feature. Further areas of applicability will become apparent from the detailed written description provided herein. The description and specific examples provided in this summary section are intended for purpose of illustration only and are not intended to limit the scope of the present disclosure.

DRAWINGS

The drawings described herein are for illustrative purposes only of a selected embodiment of a quick connect coupling assembly and are not intended to limit the scope of the present disclosure. Other advantages of the present disclosure will be appreciated when considered with reference to the following description in connection with the accompanying drawings wherein.

DETAILED DESCRIPTION

Figure 1:
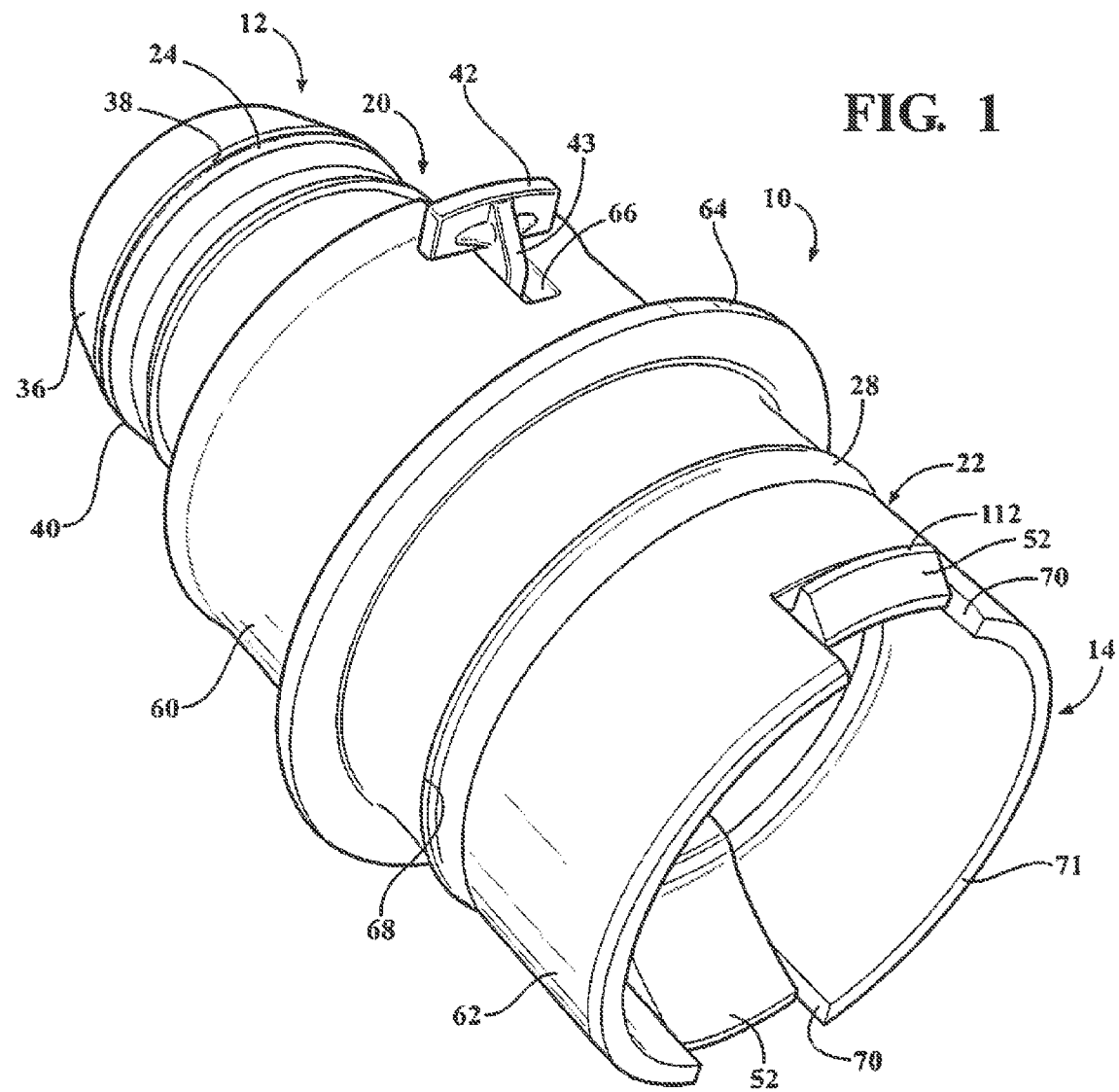
FIG. 1 is a perspective view of a quick connect coupling assembly constructed in accordance with one preferred embodiment of the present disclosure.

An example embodiment of a quick connect coupling assembly will be hereinafter described in view of the drawings. The quick connect coupling assembly of the present disclosure is operable to permit connection of a tubular component to a port segment of a mounting component and provide a fluid-tight fluid flow pathway therebetween. The example embodiment is, however, only provided so that this disclosure will be thorough, and will fully convey the scope to those who are skilled in the art. Numerous specific details are set forth such as examples of specific components, devices, and methods, to provide a thorough understanding of the embodiment of the present disclosure. It will be apparent to those skilled in the art that specific details need not be employed, that other embodiments may be embodied in many different forms and that neither should be construed to limit the scope of disclosure. In the example embodiment, well-known processes, well-known device structures, and well-known technologies are not described in detail.

Referring to the drawings, a quick connect coupling assembly 10 construed in accordance with the present disclosure is shown to generally define a first end portion 12 adapted for connection to a tubular component 13 and a second end portion 14 adapted for connection to a tubular port segment 16 associated with a mounting component 18 to provide a fluid communication pathway therebetween. Quick connect coupling assembly 10 is defined by a plurality of components shown to include a quick connect retainer 20, a quick connect housing 22, a first O-ring 24, a second O-ring 26, and a third O-ring 28.

Retainer 20 is preferably a molded plastic component having a first tubular section 30, a second tubular section 32, and a pair of cantilevered, resilient prongs, hereinafter referred to as snap arms 34. It should be appreciated that the retainer 20 may be made of other materials including, but not limited to metal or composite materials, such as fiber-reinforced polymer. Although the embodiment of the present invention disclosed includes a pair of snap arms 34, it should also be appreciated that the retainer 20 of other embodiments may include a fewer or greater number of snap arms 34. First tubular section 30 is adapted to be received within an open end of tubular component 13 (i.e. hose, line, conduit, tube, duct, etc.) and includes a tapered entry portion 36, a first annular groove 38 adapted for receipt and retention of first O-ring 24, and a barbed portion 40 configured for retention of tubular component 13 on first tubular section 30. It should be understood that although the barbed portion 40 may extend radially outwardly from the first tubular section 30, other embodiments may include the barbed portion 40 extending inwardly from an inner surface of the first tubular section 30 to enable the retention of the tubular component 13 inserted in the first tubular section 30 of the retainer 12. A radial flange 44 delineates first tubular section 30 and second tubular section 32. Second tubular section 32 is shown to include a pair of push tabs 42 and a second annular groove 46 adapted for receipt and retention of second O-ring 26. Push tabs 42 are shown diametrically opposed. Snap arms 34 are generally aligned with push tabs 42 and extend outwardly from an end surface 48. However, it should be understood that other embodiments may include a fewer or greater number of push tabs 42 and the push tabs 42 may be configured or oriented differently than described herein.

Each snap arm 34 is shown to include a first deflector ramp 50, a second deflector ramp 52, and an intermediate locking tab 54. Snap arms 34 are best shown in FIGS. 3, 4, 6 and 7 in a free or non-deflected position. Snap arms 34 also are shown to include a first prong segment 56 and a second prong segment 58. First deflector ramp 50 extends outwardly from first prong segment 56 while second deflector ramp 52 extends outwardly from second prong segment 58. Locking tab 54 is generally located to be formed at the intersection of first prong segment 56 and second prong segment 58. First prong segment 56 of each snap arm 34 is generally arranged to extend collinearly with second tubular section 32 of retainer 20 while second prong segment 58 of each snap arm 34 is configured to extend radially outwardly relative to second tubular section 32.

Housing 22 is also preferably a molded plastic component having a first tubular section 60, a second tubular section 62, and a radial flange ring section 64 therebetween. Although the housing 22 is preferably made of plastic, it should be understood that the housing 22 may be made of other materials. A pair of elongated push tab guide slots 66 are formed in first tubular section 60 and are each sized to receive a web segment 43 of a corresponding one of push tabs 42 therein to facilitate relative axial displacement of retainer 20 relative to housing 22. A third annular groove 68 is formed in second tubular section 62 of housing 22 that is adapted to receive and retain third O-ring 28 therein. In addition, a pair of snap arm guide slots 70 are formed in an end surface 71 of second tubular section 62 are each configured to locate and retain the terminal end portion (particularly, second snap deflector ramps 52) of a corresponding one of snap arms 34 therein. This arrangement prevents relative rotation between retainer 20 and housing 22 while accommodating limited bi-directional translational movement therebetween. Each snap arm guide slot 70 includes a tapered inner edge surface 72 that is adapted to engage a portion of second prong segment 58 of a corresponding one of snap arms 34.

Figure 2:
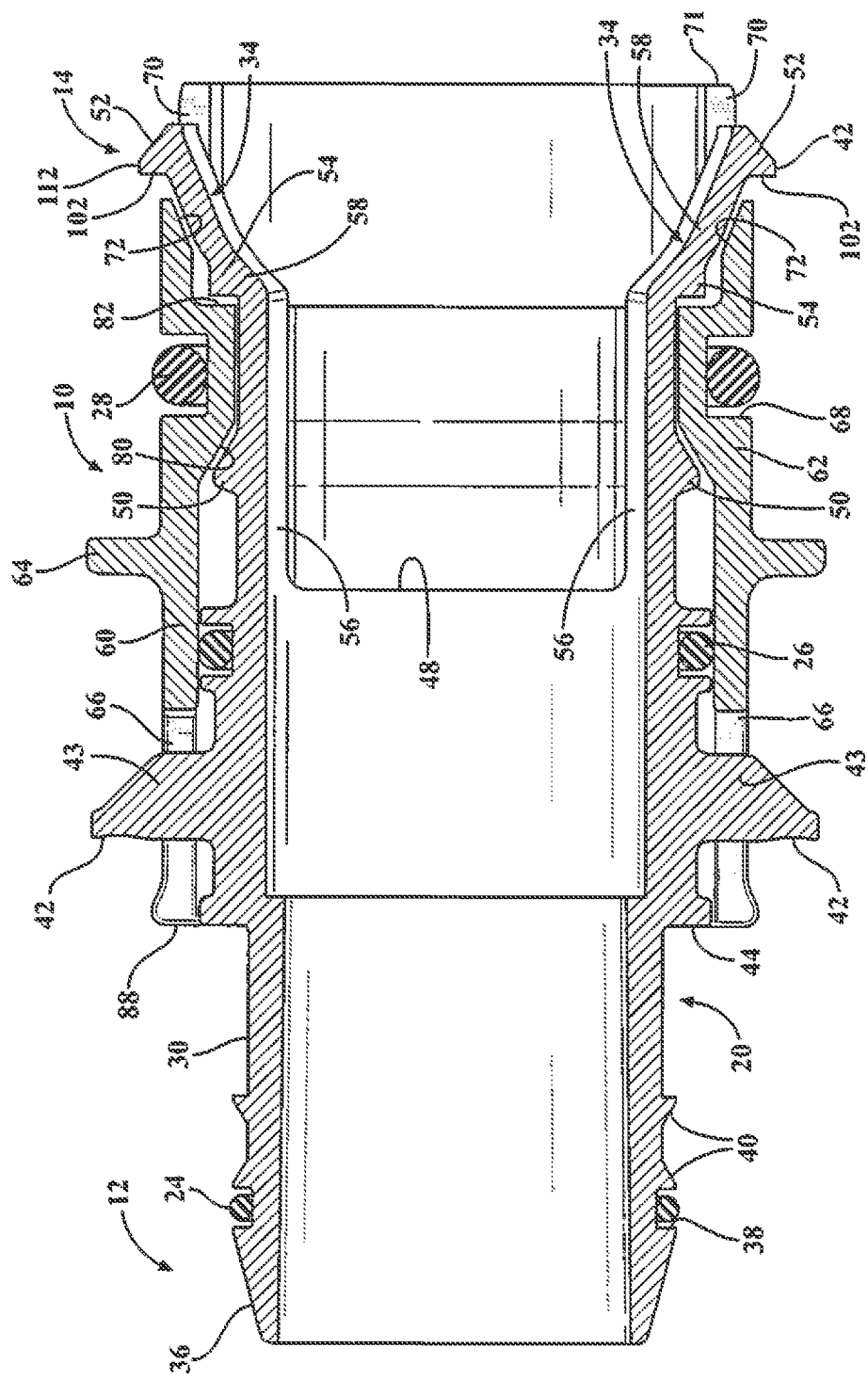
FIG. 2 is a sectional view of the quick connect coupling assembly shown in FIG. 1.
Figure 3:
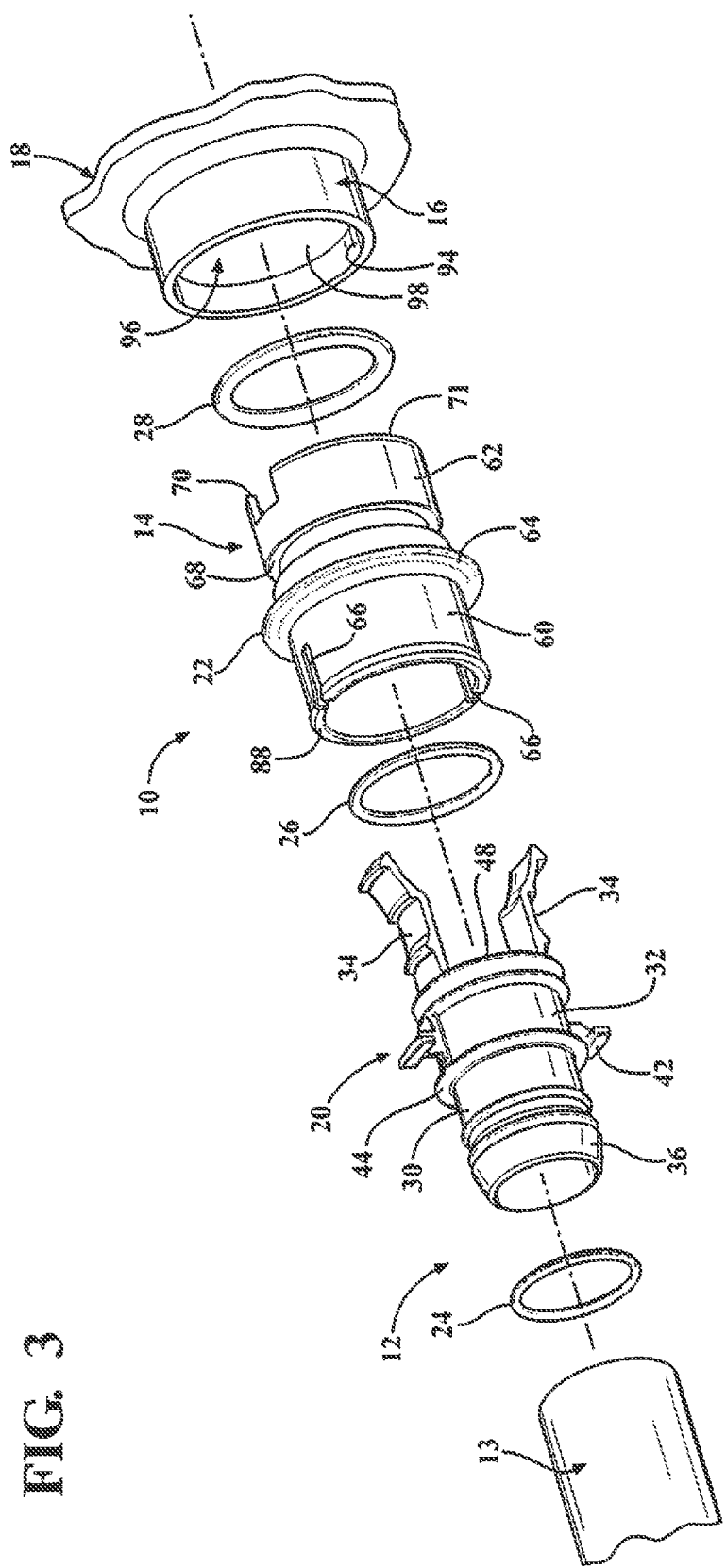
FIG. 3 is an exploded elevational view of the quick connect coupling assembly shown in FIGS. 1 and 2 in association with a mating port segment of a mounting component to which the quick connect coupling assembly can be releaseably connected.
Figure 4:
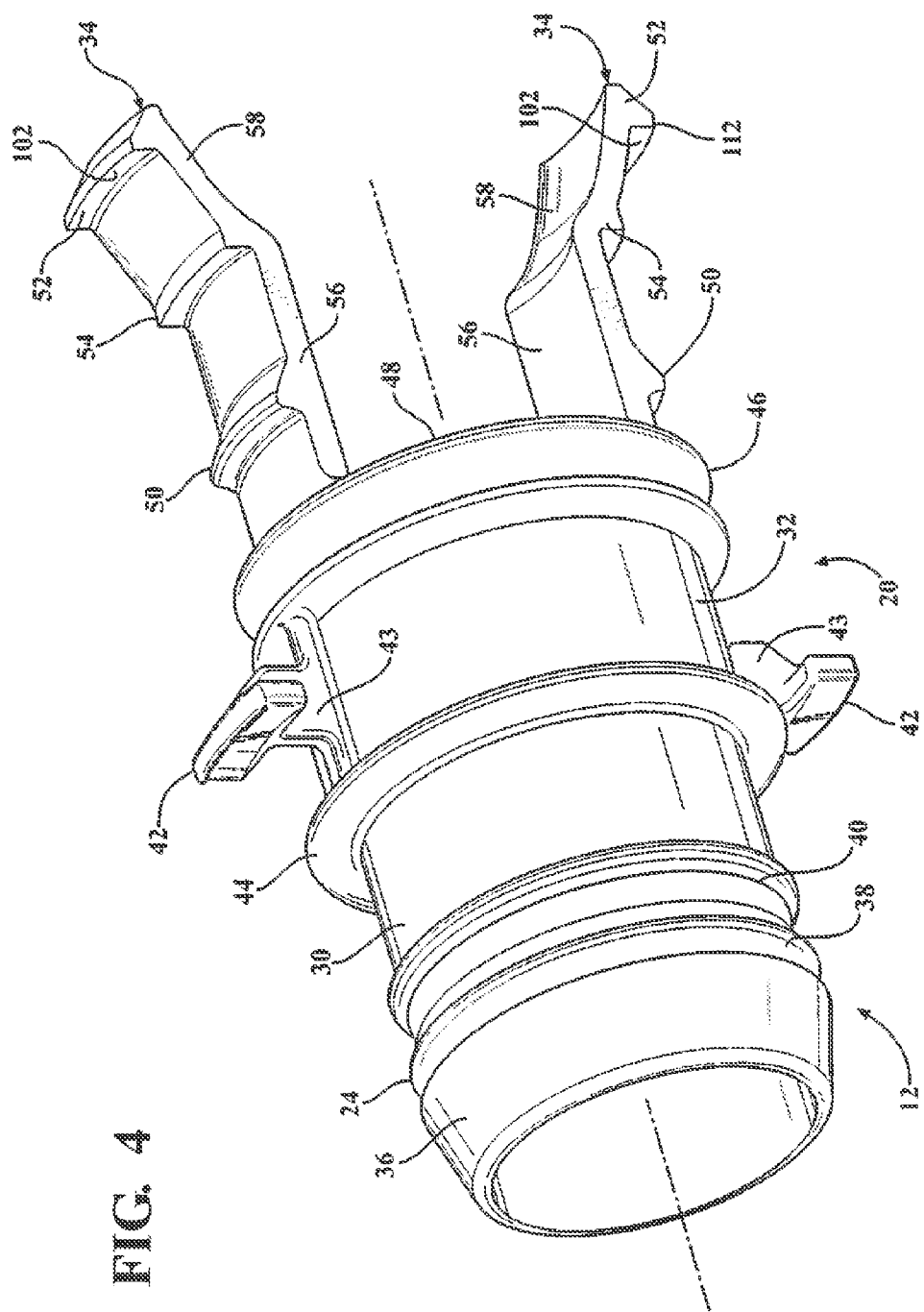
FIG. 4 is a perspective view of a retainer associated with the quick connect coupling assembly of the present disclosure.
Figure 5:
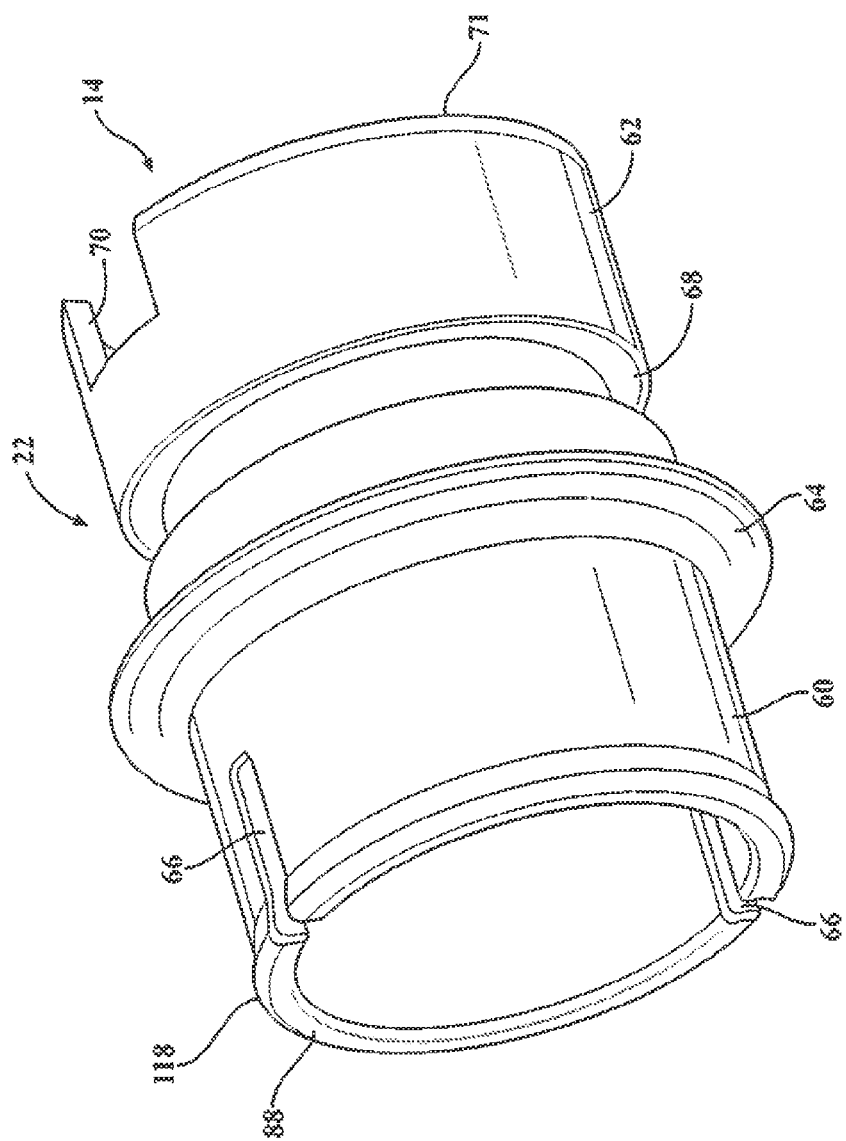
FIG. 5 is a perspective view of a quick connect housing associated with the quick connect coupling assembly of the present disclosure.
Figure 6:
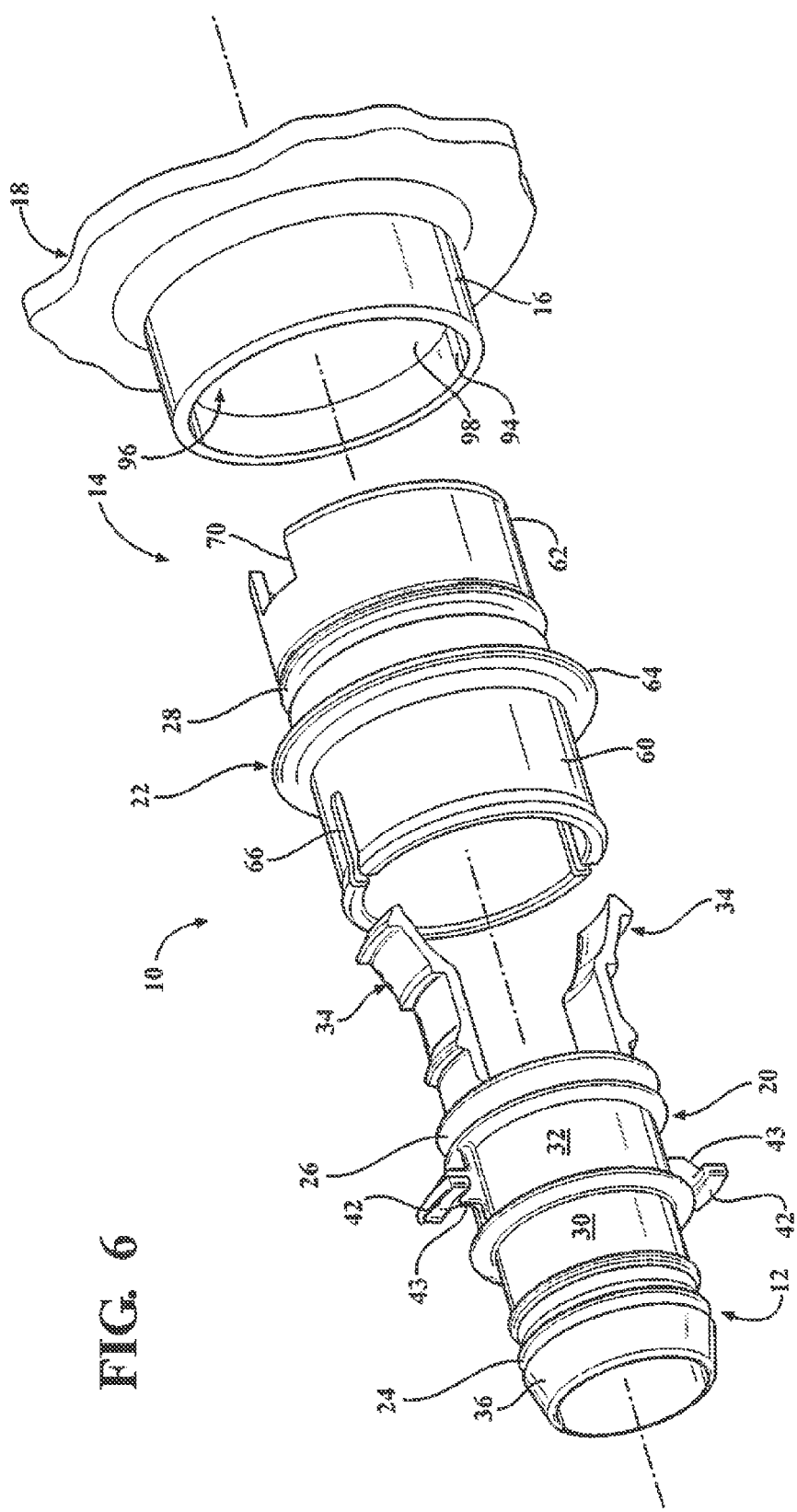
FIG. 6 illustrates the installation of O-ring seals associated with the quick connect coupling assembly.
Figure 8:
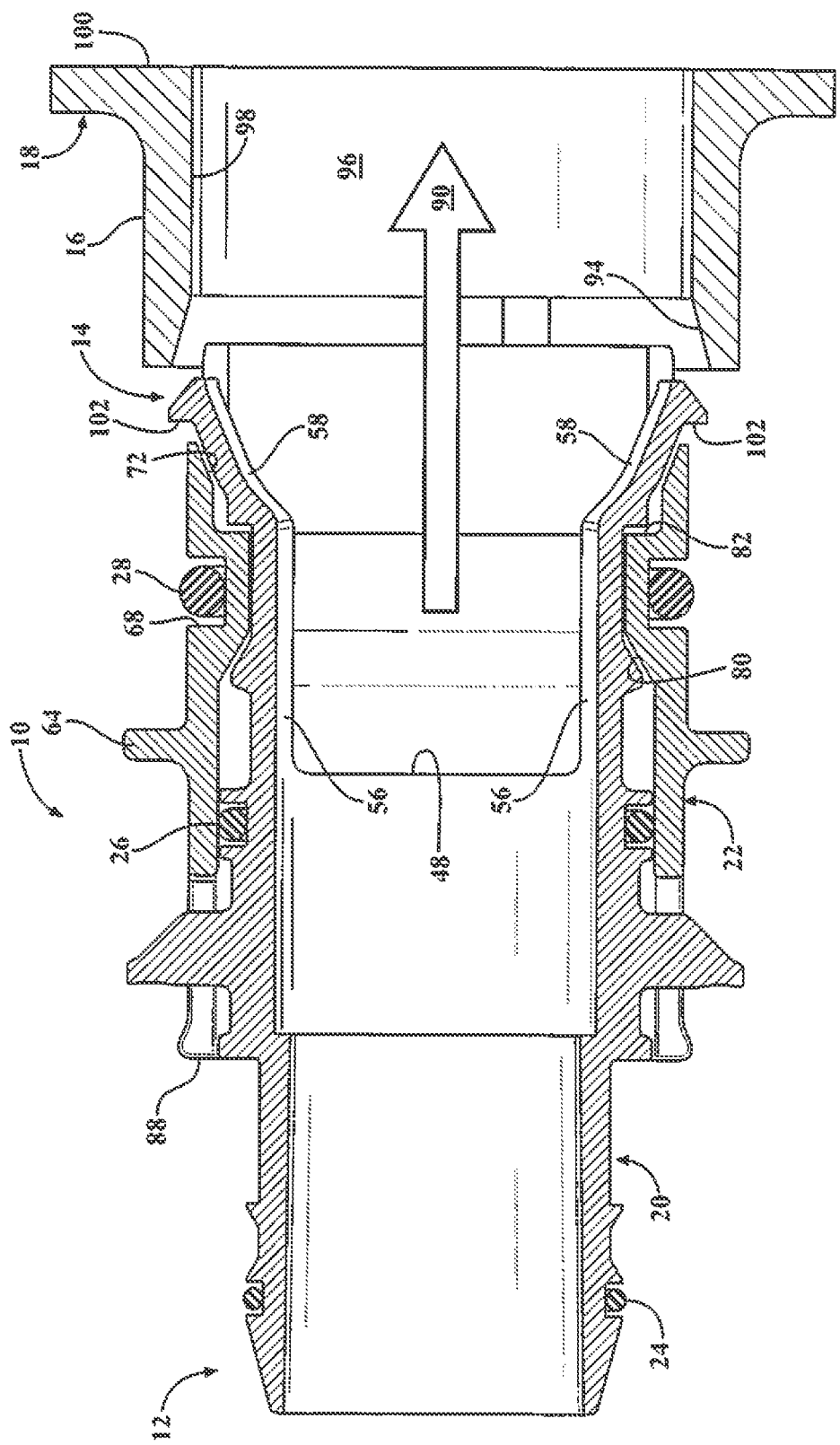
FIG. 8 is a sectional view illustrating a preferred technique for releaseably connecting the quick connect coupling assembly to the mating port segment of the mounting component.

With quick connect coupling assembly 10 in its "assembled" configuration, as shown FIGS. 1, 2 and 8, first deflector ramp 50 of each snap arm 34 is located in proximity to an inner cam surface 80 formed in second tubular section 62 of housing 22 while locking tab 54 of each snap arm 34 is located in proximity to a retention shoulder surface 82 formed in second tubular section 62 of housing 22. It should be understood that another embodiment of the present disclosure may not include a locking tab 54, and the second prong segment 58 of the snap arm 34 which extends outwardly of said snap arm 34 may instead align in proximity to said retention shoulder surface 82 of the housing 22 to secure the retainer 20 in the housing 22. Second O-ring 26 is shown to provide a fluid-tight sliding sealing arrangement between second tubular section 32 of retainer 20 and first tubular section 60 of housing 22.

Figure 7:
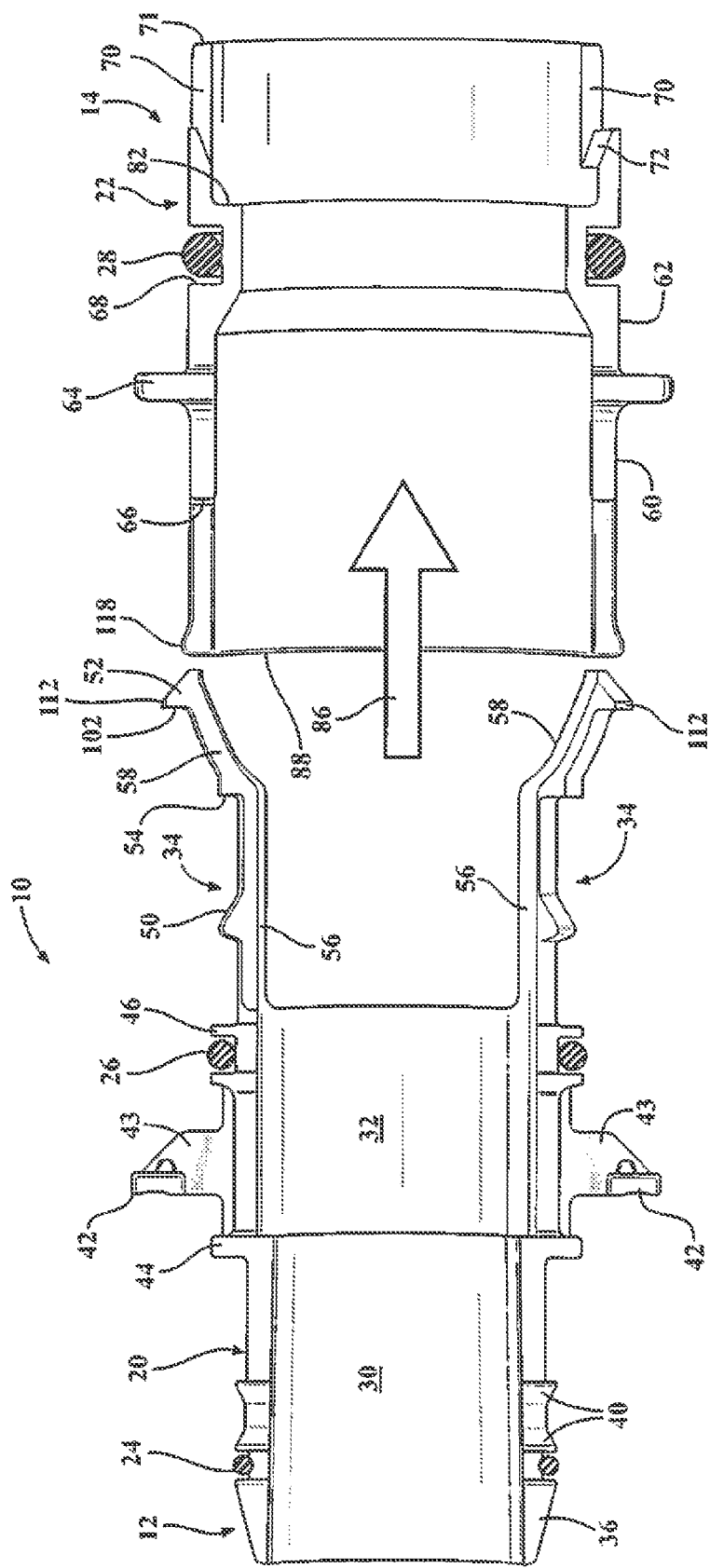
FIG. 7 is a sectional view illustrating a preferred technique for assembling the retainer to the quick connect housing.

FIG. 7 illustrates a technique or process for assembling retainer 20 with housing 22 after O-rings 24, 26, 28 have been installed in corresponding grooves 38, 46, 68. As seen, when retainer 20 is moved axially relative to housing 22 in the direction of arrow 86, second deflector ramps 52 on second prong segments 58 of snap arms 34 are resiliently deflected radially inwardly upon engagement with an edge surface 88 formed on first tubular section 60 of housing 22. Upon continued movement of retainer 20 relative to housing 22 in the direction of arrow 86, web segments 43 of push tabs 42 are positioned within push tab guide slots 66 and second prong segments 58 of snap arms 34 are positioned in snap arm guide slots 70 to establish the assembled position shown in FIGS. 1, 2 and 8.

Figure 9:
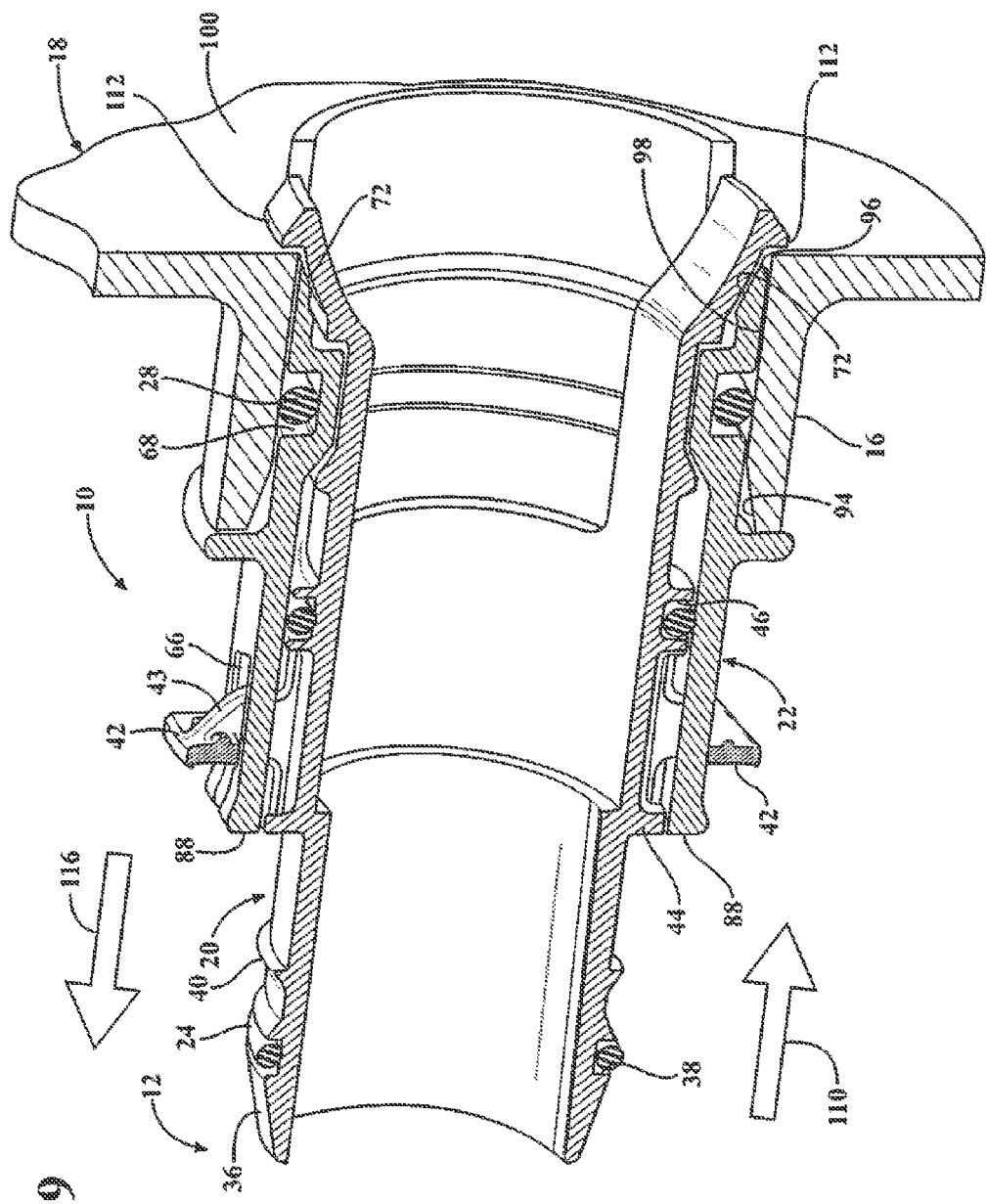
FIG. 9 is a sectional view illustrating the quick connect coupling assembly releaseably connected to the port segment of the mounting component.

When it is desired to install quick connect coupling assembly 10 to port 16, coupling assembly 10 is moved in the direction of arrow 90 shown in FIG. 8. As such, second deflector ramps 52 of snap arms 34 engage a tapered lead-in surface 94 associated with a port aperture 96 to cause radially inward resilient deflection of snap arms 34. Continued sliding movement of coupling 10 in the direction of arrow 90 permits second deflector ramps 52 to slide along a cylindrical surface 98 of port aperture 96 until second deflector ramps 52 move past a planar back surface 100 of mounting component 18. In this position, snap arms 34 are released from engagement with surface 98 of port aperture 96 and permitted to return back toward their non-deflected position until a stop surface 102 of each second deflector ramp 52 engages back surface 100 of mounting component 18. This final "installed" position of quick connect coupling 10 on port segment 16 of mounting component 18 is shown in FIG. 9. Thus, quick connect coupling 10 is configured to provide a push-in connection feature with a reverse snap lock arrangement. As seen, third O-ring 28 provides a fluid-tight sealing arrangement with surface 98 of port aperture 96. As seen, subsequent removal of quick connect coupling 10 by simply pulling outwardly is inhibited via engagement of stop surfaces 102 with back surface 100, thereby securely connecting quick connect coupling 10 to mounting structure 18.

When it is desired to intentionally release quick connect coupling 10 from its connection with mounting component 18, the push/pull disconnect feature is actuated. Specifically, an inwardly directed or "push" force is applied, in the direction of arrow 110 (FIG. 9), to push tabs 42 so as to cause retainer 20 to move axially relative to housing 22 and mounting component 18. Push tab guide slots 66 are sized to accommodate sufficient translation of push tabs 42 so as to permit first deflector ramps 50 to engage inner cam surface 80 of housing 22 which, in turn, causes radially inward deflection of snap arms 34. Upon the end of this "push" action, sufficient inward deflection of snap arms 34 has occurred such that stop surfaces 102 of second deflector ramps 52 are disengaged from back surface 100 of mounting component 18 and a slide surface 112 formed on each of second deflector ramps 52 is located to be inside port aperture 96. With retainer 20 held its "pushed" position, subsequent application of an outwardly directed or "pull" force, in the direction of arrow 116 (FIG. 9), to housing 22 (i.e. a "pull" action) permits quick connect coupling 10 to be released and removed from port aperture 96. A raised ring portion 118 formed on the end of housing 22 provides a pull grip feature.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A quick connect coupling assembly for interconnecting a tubular component to a port segment of a mounting component, comprising:

a retainer adapted to be coupled to the tubular component and having at least one resilient snap arm resiliently cantilevered from said retainer;

a housing configured for receipt within a through passage of the port segment for coupling with the mounting component, said housing having a through bore configured for receipt of said retainer therein;

said housing having an inner cam surface extending radially inwardly into said through bore, said housing being configured to abut the port segment of the mounting component;

said snap arm including a first deflector ramp aligned in proximity to said inner cam surface and a second deflector ramp adapted to releaseably engage a back surface of the mounting component and retain said coupling assembly as said housing engages the mounting component; and said retainer having a push feature permitting said retainer to be pushed axially relative to said housing and cause said first deflector ramp to engage said inner cam surface and cause said snap arm to deflect resiliently inwardly under a bias of said inner cam surface and release said second deflector ramp from engagement with the back surface and a pull feature permitting said coupling assembly to be subsequently pulled out of the port segment.

2. A quick connect coupling assembly as set forth in claim 1, wherein said snap arm includes a pair of said snap arms diametrically opposed from one another.

3. A quick connect coupling assembly as set forth in claim 2, wherein said push feature includes a pair of push tabs each extending radially outwardly from said retainer and aligned with said snap arms.

4. A quick connect coupling assembly as set forth in claim 1, wherein said push feature includes at least one push tab extending radially outwardly from said retainer.

5. A quick connect coupling assembly as set forth in claim 4, wherein said push tab includes a web segment and said housing defines at least one elongated push tab guide slot sized to receive said web segment of said push tab therein to facilitate relative axial displacement of said retainer relative to said housing.

6. A quick connect coupling assembly as set forth in claim 1, wherein said housing includes a retention shoulder surface and said snap arm includes a locking tab extending radially outwardly and aligned in proximity to said retention shoulder surface.

7. A quick connect coupling assembly as set forth in claim 1, wherein said housing includes a flange ring section extending radially outwardly from said housing for abutting the port segment of the mounting component and securing said coupling assembly as said second deflector ramp of said snap arm engages the back surface of the mounting component.

8. A quick connect coupling assembly as set forth in claim 1, wherein said retainer includes a tapered entry portion.

9. A quick connect coupling assembly as set forth in claim 1, wherein said retainer includes a barbed portion configured for retention of the tubular component with said retainer.

10. A quick connect coupling assembly as set forth in claim 1, wherein said housing defines an end surface and at least one snap arm guide slot formed in said end surface and configured to locate and retain said second snap deflector ramp of said snap arm therein for preventing relative rotation between said retainer and said housing and accommodating limited bi-directional translational movement therebetween.

11. A quick connect coupling assembly as set forth in claim 1, wherein said retainer defines a first annular groove and said coupling assembly further includes a first O-ring installed in said first annular groove of said retainer to provide a fluid-tight sealing arrangement between said retainer and the tubular component.

12. A quick connect coupling assembly as set forth in claim 1, wherein said retainer defines a second annular groove and said coupling assembly further including a second O-ring installed in said second annular groove of said retainer to provide a fluid-tight sliding sealing arrangement between said retainer and said housing.

13. A quick connect coupling assembly as set forth in claim 1, wherein said housing defines a third annular groove and said coupling assembly further includes a third O-ring installed within said third annular groove of said housing to provide a fluid-tight sliding sealing arrangement between said housing and the port segment of the mounting component.

14. A quick connect coupling assembly for interconnecting a tubular component to a port segment of a mounting component, comprising:
 a retainer adapted to be coupled to the tubular component and having at least one resilient snap arm extending outwardly and resiliently cantilevered from said retainer;
 a housing configured for receipt within a through passage of the port segment for coupling with the mounting component, said housing having a through bore configured for receipt of said retainer therein;
 said housing having an inner cam surface extending radially inwardly into said through bore, said housing being configured to abut the port segment of the mounting component;
 said snap arm including a first prong segment generally arranged to extend collinearly with said retainer and having a first deflector ramp extending outwardly and aligned in proximity to said inner cam surface;
 said snap arm including a second prong segment extending radially outwardly from said first prong segment and aligned in proximity to said housing and having a second deflector ramp extending radially outwardly and adapted to releaseably engage a back surface of the mounting component and retain said coupling assembly as said housing engages the mounting component; and
 said retainer having a push feature permitting said retainer to be pushed axially relative to said housing and cause said first deflector ramp to engage said inner cam surface and cause said snap arm to deflect resiliently inwardly under a bias of said inner cam surface and release said second deflector ramp from engagement with the back surface and a pull feature permitting said coupling assembly to be subsequently pulled out of the port segment.

15. A quick connect coupling assembly as set forth in claim 14, wherein said housing includes a retention shoulder surface and a flange ring section extending radially outwardly from said housing for abutting the port segment of the mounting component and securing said coupling assembly as said second prong segment of said snap arm engages said housing and said second deflector ramp engages the back surface of the mounting component.

16. A quick connect coupling assembly as set forth in claim 14, wherein said housing defines an end surface and at least one snap arm guide slot formed in said end surface and configured to locate and retain said second snap deflector ramp of said snap arm therein for preventing relative rotation between said retainer and said housing and accommodating limited bi-directional translational movement therebetween;
 said snap arm guide slot including a tapered inner edge surface adapted to engage a portion of second prong segment of said snap arm.

17. A quick connect coupling assembly as set forth in claim 14, wherein said snap arm includes a pair of said snap arms diametrically opposed from one another.

18. A quick connect coupling assembly as set forth in claim 14, wherein said push/pull feature includes at least one push tab extending radially outwardly from said retainer.

19. A quick connect coupling assembly as set forth in claim 18, wherein said push tab includes a web segment and said housing defines at least one elongated push tab guide slot and sized to receive said web segment of said push tab therein to facilitate relative axial displacement of said retainer relative to said housing.

20. A quick connect coupling assembly as set forth in claim 14, wherein said retainer includes a barbed portion configured for retention of the tubular component with said retainer.

* * * * *